Feb. 16, 1971     H. W. KOGELNIK     3,564,405
INSTANTANEOUS FOURIER FREQUENCY ANALYZER
USING AN INTERFEROMETER
Filed Feb. 9, 1968

INVENTOR
H. W. KOGELNIK

BY *Arthur J. Torsiglieri*

ATTORNEY

United States Patent Office 3,564,405
Patented Feb. 16, 1971

3,564,405
INSTANTANEOUS FOURIER FREQUENCY ANALYZER USING AN INTERFEROMETER
Herwig W. Kogelnik, Summit, N.J., assignor to Bell Telephone Laboratories, Incorporated, Murray Hill, N.J., a corporation of New York
Filed Feb. 9, 1968, Ser. No. 704,281
Int. Cl. G01r 23/16
U.S. Cl. 324—77                                         12 Claims

ABSTRACT OF THE DISCLOSURE

Instantaneous Fourier analysis of the frequency components in a signal is performed by means of the analysis of the pattern of interference fringes produced by two coherent light beams, which are intensity modulated in accordance with the signal and which are provided with a systematically varied phase difference between interfering rays in the beams. The phase difference is varied in accordance with a linear function of the algebraic product of time and any function of distance from a point in the interference pattern where the phase difference is always equal to zero. In one embodiment, this type of varying phase is obtained by applying a saw-tooth time varying electric voltage across a pair of compound prisms, made of electro-optic material in part, upon which the beams are incident in each arm of a Michelson interferometer arrangement, thereby deflecting the beams through an angle which is linearly proportional to the time after each saw-tooth has commenced. Observable changes in the pattern of interference fringes occur when the light intensity is thus modulated in accordance with the signal, as compared with no such modulation, and these changes occur only at positions in the interference pattern determined by the respective frequency components in the signal.

FIELD OF THE INVENTION

This invention relates generally to apparatus for measuring the frequency distribution in a signal, commonly known as "Fourier analyzers," and more particularly to apparatus for signal frequency and phase measuring which utilize intensity modulation of optical radiation, visible or invisible, by the signal.

BACKGROUND OF THE INVENTION

Fourier frequency analysis or frequency measurement of a signal has been performed in the prior art in many different ways. In particular, Pat. No. 3,052,843 issued Sept. 4, 1962 to H. Hurvitz discloses a frequency measuring system utilizing optical techniques. These techniques involve a first modulation of the intensity of an optical beam in accordance with the signal to be analyzed, and a second further intensity modulation in accordance with a spectrum of predetermined (standard) frequencies. The resulting time-integrated optical intensity at a detector photocell surface is a maximum where the predetermined standard frequency(s) is equal to the signal frequency(s). However, in this system the means to provide this spectrum of predetermined standard frequencies is difficult to prepare and cumbersome to operate.

SUMMARY OF THE INVENTION

The present invention utilizes the intereference pattern of two mutually coherent optical beams, either or both of which are modulated in intensity according to the signal to be analyzed, which are then deflected to form a pattern of interference fringes. In addition, the phase difference between two interfering rays in the respective beams is made to vary in a linear proportion to the algebraic product of time and distance along a detector surface in the interference pattern. No spectrum of standard frequencies is required. Advantageously these beams are plane waves, of limited cross-section; and they are mutually coherent in the sense that the phase difference between them at their respective cross-sections, in the absence of the variable part of the deflection, is independent of time.

The modulation of the beams in accordance with the signal causes observable changes to occur in the time integrated intensity of the intereference pattern at certain positions along the detector surface. These positions are determined by the frequency of the Fourier components in this modulating signal, thereby yielding the desired Fourier analysis of the signal.

Typically, the detector surface is a photoelectric surface which integrates the light intensity over a time interval. Integrated values of electric charge at the various positions of the photoelectric surface will vary in accordance with the amplitude of the corresponding Fourier frequency component int he modulating signal. This pattern of electric charge may be scanned by a cathode ray beam and visually presented on a cathode ray tube or recorder, to indicate the frequency and amplitude of the Fourier component in the signal.

In a specific embodiment, the above described variable intereference pattern is obtained by means of a Michelson type interferometer where in each arm there is placed a compound prism, somewhat similar in construction to Wollaston or Rochon prisms. Advantageously, each of these compound prisms consists of a small angle prism made of material with controllably variable refractive index and a small angle prism of constant refractive index. The material with variable refractive index may be electro-optic or photoelastic, for example. The refractive indices of the prisms are arranged so that, at time $t=0$, each compound prism does not deflect the beams through any angle at all; whereas at other times, as a consequence of varying the refractive index with the time by means of a time-varying signal, each of the beams undergoes a small angular deviation, each in the opposite sense from the other, which is linearly proportional to the time. The detector surface is placed perpendicular to the propagation direction of the beams after they have been combined and exit from the interferometer. Thereby, the above described linear relationship of phase difference between interfering rays in the beams is obtained with respect to time and position along the detector surface.

This invention, its objects, features and advantages will be better understood upon consideration of the following detailed description when taken in conjunction with the acompanying drawing in which.

Figure 1:
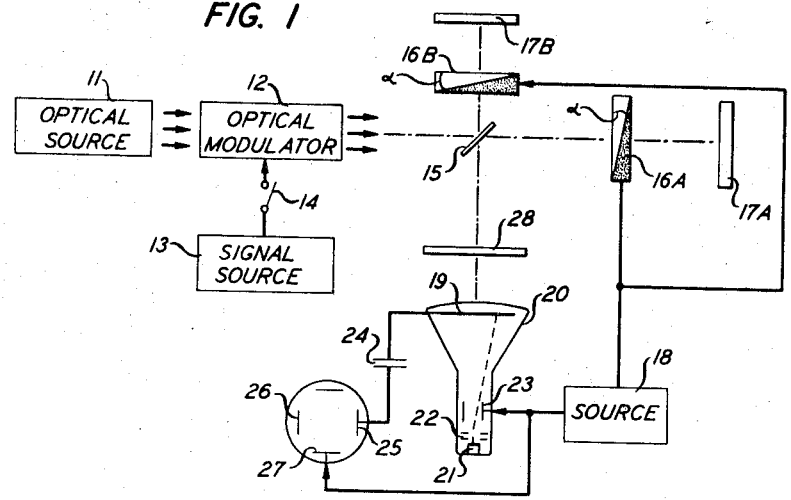
FIGS. 1 and 1A are each block diagrammatic illustrations of different Fourier analyzing systems in accordance with this invention.

In FIG. 1, the reference numeral 11 denotes an optical source of coherent light of constant intensity, such as an intensity-regulated laser for example. The light from this source 11 is modulated in intensity by the signal, to be analyzed, applied to light modulator 12 from a signal source 13. Switch 14 enables disconnection of the signal source 13.

The modulated light emanating from the modulator 12 is advantageously in the form of a plane wave of rectangular cross-section obtained by means of optical lenses and stops (not shown), familiar in the art. This beam is directed at a semisilvered mirror 15 mounted at 45° to the path of the beam, in a Michelson interferometer arrangement, which also includes mirrors 17A and 17B. After being split into two beams by the semisilvered mirror 15, the individual beams pass through compound prisms 16A and 16B, respectively, controlled by the time varying signal from the linear source 18 accordingly as will be described in greater detail below. Thereafter, the individual beams strike mirrors 17A and 17B, respectively. The respective beams are there reflected by the mirrors, and then pass again through compound prisms 16A and 16B respectively, but in the opposite direction from the earlier passage therethrough. This is achieved, for example, by mounting these mirrors 17A and 17B perpendicular to the respective beams. Then the beams are redirected by the semisilvered mirror 15 to propagate toward and form an interference pattern upon photoelectric detector surface 19 of a vidicon 20 or like device.

Each of the compound prisms 16A and 16B includes an electro-optic prism portion (shaded in FIG. 1) and a nonelectro-optic prism portion (nonshaded). The refractive indices of both portions of both compound prisms 16A and 16B advantageously are selected such that, for a certain instantaneous value of the electric field $E_0$ at say $t=0$, applied thereto from the source 18, each beam undergoes no deflection on traversing these compound prisms. Typically, the two portions (of each prism) themselves are right-angled prisms with equal and relatively small apex angles compared with one radian (denoted by $\alpha$ in the figure) whose hypotenuses are cemented together, the refractive indices of the two portions being equal in the presence of the applied electric field $E_0$. The compound prisms 16A and 16B are optically identical except that in the presence of fields other than $E_0$, each compound prism tends to deflect the beam in the opposite direction from the other, as viewed from the photoelectric detector surface 19. In addition, these prisms 16A and 16B are mounted advantageously at equal distances from the semisilvered mirror 15.

The source 18 has a time-varying output voltage signal which is applied to the prisms 16A and 16B, typically by means of electrodes (not shown) known in the art. This source 18 causes the refractive index of the electro-optic portions to vary linearly in time, as shown by curve 21 or 21A in FIG. 2 or FIG. 2A, respectively, by methods well-known in the art. This variation of refractive index causes the beams to be deflected through an angle which itself varies linearly in time.

Figure 2:
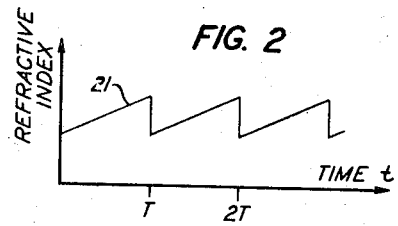
FIGS. 2 and 2A show curves useful in illustrating the operation of this invention.
Figure 2A:
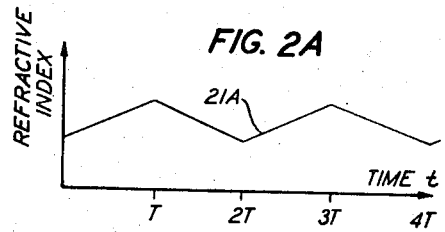

FIGS. 2 and 2A are typical plots of the index refraction of the electro-optic portions of the compound prisms 16A and 16B versus time, as caused by the source 18. It should be understood, however, that any nonlinearities in the response of the electro-optic material in the prisms 16A and 16B as well as nonlinearities in the angle of deflection caused by the finite size of the prism angle $\alpha$ advantageously should be cancelled by a compensating adjustment of the time-varying signal output of the source 18. The linear saw-tooth variation shown in FIG. 2 may be used; and as an alternative, the linear triangular variation shown in FIG. 2A may also be used. As shown in FIG. 2, each saw-tooth has a duration of time equal to T, called a period. As shown in FIG. 2A, each triangle has a duration of time equal to 2T.

It should be understood that scanning by the electron beam in the vidicon tube 20, of the pattern of charges accumulated during each time interval T on the surface 19, ideally should take place during a period of time thereafter which is very short compared with T, in order to lose little of the information in the signal source 13. Thus, for this very short period of time after each time interval T, ideally the optical source 11 is turned off, or interrupted, while the electron beam guided by the source 18 whose output is applied to the horizontal deflection electrode 23, scans the detector surface 19. In this way, the Fourier analysis displayed on the cathode ray tube 26, guided by the source 18 whose output is applied to the horizontal deflection electrode 27, represents the analysis of the signal source 13 corresponding to a definite time interval T. However, other modes of operation are possible.

It is not always required of the system to analyze over a time interval T which is *simultaneous* for all frequencies of interest, such as when the system is being used merely as a detector of certain frequencies in the signal source 13. In such cases, the scanning time may be coextensive with the time intervals T, for example.

Returning to the vidicon tube 20, it includes a heated cathode 21, an electron lens or beam forming system 22, and electron beam horizontal deflection electrodes 23. The electron beam at a typical instant of time is indicated by the dotted line. This beam is caused to scan periodically over the detector surface 19. This is accomplished by application to deflection electrodes 23 of a time varying voltage in the form of a saw-tooth from the source 18 of period advantageously also equal to T. This beam thus reads off, in a manner well known, the accumulated charges developed on the detector surface 19 by the modulated impinging light beam from the interferometer.

The output signal produced by the scan of the detector surface 19 can be supplied, for example, through a direct current-blocking condenser 24 to vertical deflection electrode 25 of cathode ray tube 26. Horizontal deflection electrode 27 of this tube 26 is connected to the source 18 which supplies the electrode 27 with a saw-tooth voltage, in synchronism with the saw-tooth voltage supplied to electrode 23 of the vidicon tube 20. Thereby, a line base is established on the cathode ray tube 26 in the $y$ direction as indicated in FIG. 1 at the detector surface 19, which is proportional to, and representative of, the frequency to be detected and measured.

The display on the face of the cathode ray tube 26 thus presents the desired Fourier analysis. The horizontal deflection on the tube 26 is the frequency measuring scale; the vertical deflection is directly related to the amplitude (and also phase) of the corresponding Fourier frequency component in the signal source 13.

A polarizer 28 is placed in the path of the beam from source 11 to the detector surface 19. This polarizer 28 is advantageously oriented so as to allow the detector surface 19 to have incident upon it only that radiation in the beams which is polarized with its electric displacement vector parallel to the optic axis of the electro-optic material in the compound prisms 16A and 16B; that is to say, the polarizer advantageously is oriented so as to allow transmission and subsequent detection of only the extraordinary ray which is affected by the time-varying signal output of the source 18 applied to the prisms 16A and 16B. This is advantageous to prevent a possible difficulty in interpreting the resulting interference pattern at the surface 19, which would otherwise occur by reason of the ordinary rays and extraordinary rays differing interference patterns superposed upon each other. A detector surface 19 which is sensitive only to electromagnetic radiation polarized parallel to the optic axis of the compound prisms 16A and 16B could obviate the necessity for the polarizer 28.

Figure 1A:
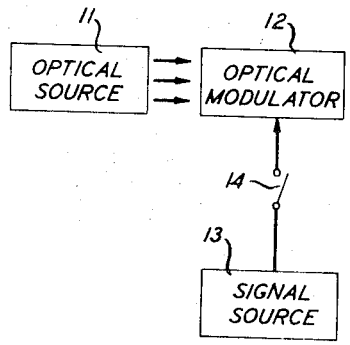

As shown in FIG. 1, the origin O at the surface 19, where the X and Y axes intersect is determined by the intersection of the broken center line shown in FIG. 1 with the surface 19. This center line which determines the X axis, in turn is determined as the locus of those points, along which the phase difference between interfering rays in the beams, exiting from the semisilvered mirror 15, is independent of time, no matter what field from the source 18 is instantaneously applied to these prisms. For example, if the two arms of the interferometer are adjusted such that, in the absence of the signal from source 18 applied to prisms 16A and 16B, constructive interference results everywhere along the surface 19, and if the compound prisms 16A and 16B are mounted at equal optical distances from the surface 19, as are the mirrors 17A and 17B also, then this center line is simply the extension of that perpendicular from mirror 17B which passes through the midpoint of compound prism 16B. FIG. 1A shows an alternative arrangement of the system in FIG. 1. In FIG. 1A, however, the mirrors 17C and 17D are positioned at 45° to the respective directions of propagation of the light beams, so that these beams are thereby reflected and directed to the semisilvered mirror 15A. After partial reflection and transmission by the semisilvered mirror 15A, both photo detector surfaces 19A and 19B receive the optical interference patterns and accumulate charge patterns representative of the Fourier analysis. Scan and display of the accumulated charge pattern on either of the detector surfaces 19A and 19B may be accomplished, if desired, by an arrangement of vidicon and cathode ray tubes; as is obvious from FIG. 1. A problem may arise in the arrangement shown in FIG. 1 in that some of the light emanating from the interferometer returns back to the optical modulator 12 and the optical source 11. The arrangement shown in FIG. 1A avoids this possible problem completely; but it does not yield as much deflection, and hence resolution between adjacent frequencies to be measured, as the arrangement shown in FIG. 1. In what follows, the arrangement shown in FIG. 1 will be discussed, but it should be obvious how to apply this discussion to the arrangement shown in FIG. 1A.

ADJUSTMENTS

It will now be shown how to adjust the Michelson interferometer apparatus shown in FIG. 1, and in particular, how to mount the mirrors 17A and 17B, in order to detect and measure the Fourier frequencies and phases of a signal source 12.

It is advantageous, first of all, to adjust the mirrors 17A and 17B in parallelism, that is, such that the image of one of them in the semisilvered mirror 15 is parallel to the other, or preferably superposed upon the other. Also, it is advantageous to design the compound prisms 16A and 16B so that the apex angle $\alpha$ is small compared with one radian and so that the index of refraction of the electro-optic material therein is linear in its response to the source 18 of a linearly time varying voltage. In this way, an advantageous linear relation will easily be obtained, in the apparatus shown in FIG. 1, between the angular deflection of each beam (one clockwise, the other counterclockwise) and the time. Except for a possible constant, the phase delays of interfering rays in the two beams at the detector surface 19 are equal in magnitude but opposite in algebraic sign or sense, and both delays are linearly proportional to the time. Thereby an advantageous linear relation will also be obtained between the phase difference between interfering rays in the beams, at the surface 19, and the time.

It is also advantageous to adjust the time-varying signal output of the linear source 18 such that at $t=0$ there is no deflection of the beams by the prisms 16A and 16B. Thus, at $t=0$ the level of optical intensity will be uniform across the surface 19, provided the mirrors 17A and 17B are adjusted to parallelism. Additionally, if the interfaces between the shaded and unshaded portions of the compound prisms 16A and 16B are straight lines in the plane of FIG. 1, then the equal but opposite phase delays in the beams at surface 19 at times different from $t=0$ will be linearly proportion to the product of time $t$ with distance $y$ as measured from the origin O. Thereby the phase difference $\psi$ between interfering rays in the two beams incident upon surface 19 will also be linearly related to the product of time $t$ with distance $y$, that is:

$$\psi = (kyt + \theta) \quad (1)$$

In this Eq. 1, $k$ is a constant depending upon the parameters of the system including the value of T (see FIGS. 2 and 2A) and the wavelength of the optical source 11; and $\theta$ is a constant phase angle which depends, among other things, upon the difference in the optical paths in the arms of the interferometer, i.e., between semisilvered mirror 15 and the mirrors 17A and 17B. It should be noted here that it is the linear relation of the phase difference $\psi$ to the algebraic product of time $t$ with distance $y$, in the expression for the phase difference in Eq. 1, which gives rise to useful results in this invention.

Viewed in another aspect, this phase difference $\psi$ between interfering rays in the pattern at the detector surface 19 arises from the intersection and superposition of the two beams exiting from the semisilvered mirror 15 at an angle between their propagation directions which varies linearly in time. Further, this angle between their propagation directions arises from the deflection of each beam in an opposite sense from the other (one clockwise, the other counterclockwise) through an angle which varies linearly in time. At time $t=0$, each beam advantageously instantaneously exits from the interferometer without any deflection, however. Thus, at $t=0$, the detector surface 19 is uniformly illuminated instantaneously.

Two types of convenient settings are particularly advantageous in the adjustment of the lengths of the arms of the interferometer, that is, the distances between the semisilvered mirror 15 and the mirrors 17A and 17B.

In one type of adjustment, by methods known in the art, the constant phase angle $\theta$ in Eq. 1 is made to satisfy $$\theta = m\pi \quad (2)$$

where $m$ is an integer: 0, ±1, ±2 etc. In this way, due to the variation of the phase $\psi$ from O to T, constructive and destructive interefrences yield intensities at surface 19 which are above and below the uniform reference level of the unmodulated component of the beams. These constructive and destructive interferences occur at various instants of time at various positions $y$ along the detector surface 19. However, integration by the detector surface 19, from O to T, of all these effect and their display on cathode ray tube 26 leads to a useful result, namely that there will be vertical deflections on the tube 26 in certain regions thereof corresponding to the neighborhoods of only certain points $y$ on the surface 19.

For example, assume the signal source 13 is of the form $V_s \cos(2\pi f_s t - \Phi_s)$, containing but a single frequency $f_s$, amplitude $V_s$, and with an initial phase $\Phi_s$ at $t=0$. Then there will be a vertical deflection on the cathode ray tube 26 in a neghborhood centered at a position on the tube 26 corresponding to $y = y_s$ on the surface 19 with $y_s$ directly proportional to the frequency $f_s$. The amplitude $A_s$ of this deflection is proportional to the amplitude $V_s$ as follows:

$$A_s \sim \pm_s \cos \Phi_s \quad (3)$$

By superposition, if the signal source contains many frequencies, then there will be many such neighborhoods corresponding to each of the frequencies at which vertical deflections will be presented on the cathode ray tube 26.

Likewise, by adjusting the arms of the interferometer such that $$\theta = (m + \tfrac{1}{2})\pi \quad (4)$$

then the vertical deflections $A_s$ will be proportional to:

$$A_s \sim + V_s \sin \Phi_s \quad (5)$$

In the proportionalities (3) and (5), the ambiguity in the ± sign may be removed by adjusting $m=0$, in which case the upper (+) sign is valid for a signal source 13 of the form $V_s \cos(2\pi f_s t - \Phi_s)$. Thus, the Fourier analysis is unambiguously presented completely by means of the two adjustments, both phase and amplitude being measurable thereby.

It should be noted that various settings other than those given by Equations 2 and 4 may be used, yielding deflections $A_s$ which are various functions of $\Phi_s$ and $\theta$. Also, the period of time from O to T advantageously should be chosen such that the product $f_s T$ is large compared with unity, where $f_s$ is the largest frequency to be measured for reasons of the uncertainity principle as is known in the art.

EXAMPLE

Figure 3:
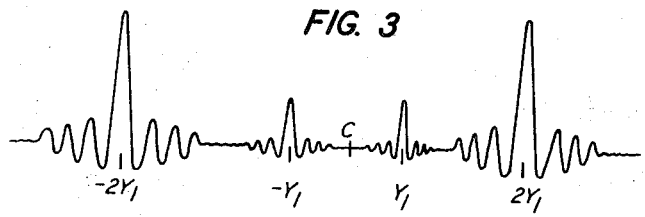
FIG. 3 shows a sketch of a display of the Fourier frequency analysis obtainable in the practice of a specific embodiment of this invention.

As an example, FIG. 3 shows the deflection on cathode ray tube 26 produced by the arrangement shown in FIG. 1 under the following conditions: $\theta$ is adjusted zero ($m=0$ in Eq. 2); the signal source 13 contains two frequencies, one of which (the second harmonic) is twice the other (the fundamental), and both initial phases are zero. Further, in this example, the second harmonic has an amplitude which is three times that of the fundamental. Thus, the signal source 13 in this example may be represented as a signal V given by $$V = A[\cos(2\pi f_1 t) + 3\cos(4\pi f_1 t)] \qquad (6)$$

where $f_1$ is the fundamental frequency. On either side of the center, C, of the cathode ray tube display shown in FIG. 3 there are two peaks corresponding to $\pm y_1$, and $\pm 2y_1$, representing the fundamental and second harmonic, respectively. The peaks corresponding to the second harmonic are three times as high as the peaks corresponding to the fundamental, in view of the assumed amplitude ratio of these frequencies. Due to the finiteness of T, the time of each saw-tooth (see FIG. 2 or 2A), each of these peaks contains some fine structure of half-width corresponding to a frequency range $1/T$, which is the best theoretical resolution possible in accordance with well-known uncertainty principles.

The display shown in FIG. 3 is redundant, in that there is symmetry about point C, which corresponds to point O at surface 19. This redundance could be removed by appropriate stops, corresponding to the redundant region, as should be obvious to workers in the art. Alternatively, corresponding halves of the compound prisms 16A and 16B may be eliminated. In cases where only certain frequency ranges are of interest, it is obvious that further stops or elimination of portions of the compound prisms may be advantageous.

MODIFICATIONS

It should also be obvious that instead of having the optical source 11 monochromatic, a polychromatic source may be used provided the detector surface 19 is not affected by or sensitive to the additional frequencies emitted by the source 11. A polychromatic source may also be used provided that the various optical frequencies emitted by the source 11 are either sufficiently close together or far apart so that the pattern of interference fringes at the detector surface 19 is distinct in the region(s) of interest, corresponding to the frequency of interest. It should also be noted that the degree or depth of modulation of the light beam by the modulator 12 advantageously should be small, for linear modulation. This is also advantageous to prevent introducing spurious harmonics into the system. It may also be mentioned here, that if the modulator 12 is not linear with respect to changes in the signal, spurious harmonics would also arise.

The modulator 12 may be placed in one or both arms of the interferometer itself instead of before the semisilvered mirror 15 as shown in FIG. 1. Only a portion of one of the beams in the interferometer need be modulated by the modulator 12, in those embodiments where only a given frequency range is of interest. This portion should contain the rays which strike the detector surface 19 in the regions corresponding to the desired frequency ranges to be measured.

Advantageously the semisilvered mirror 15 is made such that the two beams in the two arms of the interferometer are of equal intensity, as is well known in the art. However, this important only for optimal efficiency in the magnitude of the display in cathode ray tube 26, since any excess of intensity of one beam over the other merely results in an extra constant in the background, which is blocked by the condenser 24, at the expense of the magnitude of the desired display.

It may also be pointed out that in its broader aspects this invention may utilize may means whatever to provide the intensity modulated beam which strikes the semisilvered mirror 15. Thus, a more elementary optical source 11 and modulator 12 could be a sodium vapor lamp whose applied voltage is varried by the signal source 13, provided that care be taken to ensure uniformity of illumination thereby of the detector surface 19 in the absence of any signal from the source 13. As known in the art, good collimation can achieve this coherence. It should be understood also that the optical source 11 may include two or more lasers, whose phases are "locked" together, thereby producing the two beams in the two arms of the interferometer which are mutually coherent with or without the need of the semisilvered mirror 15.

Although the beam from the optical source 11 has been described in terms of uniform (constant) intensity over its cross section, it is possible to practice this invention with beams of nonuniform intensity. However, in such a case, the height of the various maxima in the display in the cathode ray tube 26 will not be in proportion to the amplitude A of the various Fourier frequency components present in the signal 13, nor to $A \cos \Phi_s$ or $A \sin \Phi_s$; but these heights of the maxima will also depend upon the particular nonuniformity of intensity.

Although the above description has been given in terms of electro-optic material in the compound prisms 16A and 16B, it is clear that photoelastic material could be used in conjunction with an applied mechanical stress from the linear source 18 to yield the variable refractive with time shown in FIG. 2 or 2A. Likewise, magneto-optic material could be used in the compound prisms 16A and 16B in conjunction with magnetic fields supplied by the linear source 18.

It may also be remarked that instead of the compound prisms 16A and 16B and mirrors 17A and 17B which are adjusted such that at $t=0$ there is no phase variation with distance y in accordance with the adjustments outlined above, it is also within the broader aspects of this invention to omit this requirement. For example, instead of the compound prisms 16A and 16B, ordinary single prisms of electro-optic or photoelastic material could be used in conjunction with a more complex arrangement of comparators, as known in the art, to detect and display the changes in the resulting more complex pattern of interference fringes thereby produced at the detector surface 19 in the presence versus absence of modulation by the signal source 13, that is, with the switch 14 in the closed versus open position. Thus, it should be obvious to those skilled in the art how to utilize other interference arrangements instead of the interferomeer arrangement 15, 16A, 16B, 17A, 17B for practicing the invention, including Fresnel's double mirrors, Fresnel's three mirrors, biplates, Billet's split lens, etc., as described in the prior art. See for example, the "Theory of Light" by Thomas Preston, McMillan, 1928, pp. 164–189 for description of the arrangements. In all of these arrangements, it should be obvious from the above disclosure how to vary either the relevant refractive index, the angle or the distance between the various elements, in these arrangements for performing the function of the interferometer 15, 16A, 16B, 17A, 17B, hat is, to achieve an interference pattern in which the phase difference between interferring rays varies linearly in the time, as is important in this invention. For example, the prisms 16A and 16B may be omitted while the linear source 18 produces a rotation of the mirrors 17A and 17B through a small angle varying linearly in time.

In the broader aspects of this invention, therefore, the ordinate of FIG. 2 or FIG. 2A represents the resulting variation with time of the phase difference $\Psi$ between interfering rays in the beams forming the interference pattern at a given value of y along the detector surface 19. Still more generally, the phase Ψ may in accordance with the algebraic product of time with any function of distance $f(y)$ instead of with distance itself. Fourier analysis then is accomplished by reinterpreting, by means of a transformation of scale, the frequency scale corresponding to distance in the y direction along the detector surface 19. To achieve such generality in the variation with distance, the design of shape of the electrodes and the shape of the electro-optic material in the compound prisms 16A and 16B should be modified from the linear intersection between the shaded and unshaded portions shown in FIG. 1 to more general types of curvilinear intersections. Also, beams other than plane waves may also be used to yield a frequency scale along the y axis (in FIG. 1) which is not linear. Hence, this invention may be practiced with the interference pattern formed by signal modulated radiation wherein two interfering rays, at the detector surface 19, have a phase difference which varies linearly in the algebraic product of time and any function of distance, $f(y)$, along the detector surface 19.

It should be obvious, in view of the above disclosure, how to obtain an interference pattern with all these arrangements such that, at any point of the pattern, two interfering rays differ in phase linearly in the algebraic product of the time and any function of distance along the pattern, as is desired in the practice of this invention.

What is claimed is:

1. In an apparatus employing first and second coherent beams of externally supplied radiation for producing an interference pattern at a surface:
   (a) first means, for producing a first spatial and time-varying phase delay in a first beam of said radiation at said surface, and
   (b) second means, for producing a second spatial and time-varying phase delay in a second beam of said radiation, the said first delay being equal in magnitude to the said second delay but opposite in algebraic sense therefrom at said surface, the resulting phase difference between interfering rays in said first and second beams at the said surface being linearly related to the algebraic product of time with a function of distance along said surface from a reference point, said phase difference being independent of time at said reference point.

2. Apparatus in accordance with claim 1 in which the first and second means include:
   first and second compound prisms, respectively, each of which is positioned in the path of a different one of the beams, each of said compound prisms including material with a variable refractive index; and
   means for varying the refractive index of the said material in both said compound prisms in a linear relationship with time.

3. In apparatus for performing a Fourier analysis of a signal by providing an interference pattern representing the Fourier frequency analysis of the signal at a detector surface:
   (a) means for providing first and second mutually coherent beams of radiation, the intensity of which is modulated in accordance with the signal over at least a part of the cross section of at least one of the beams;
   (b) first means for deflecting the first beam to strike the detector surface and producing a first phase in the first beam thereat, in a first sense which is linearly related to the algebraic product of time with a function of distance along the detector surface; and
   (c) second means for deflecting the second beam to strike the detector surface and to interfere with the first beam and producing a second phase in the second beam at said detector surface, said phase being linearly related to the algebraic product of time with a function of distance along the detector surface in the opposite sense, whereby an interference pattern at the detector surface is produce which is representative of the said Fourier analysis.

4. Apparatus in accordance with claim 3 in which the means for providing the first and second beams include an optical source of a beam of light and a first semisilvered mirror, positioned in the path of the beam, from which emanate the said first and second beams, and in which the means for deflecting the first beam and producing the first phase at the detector surface include:
   a first prism positioned in the path of the first beam said first prism including electro-optic material, and a source of electric voltage which is applied to the first prism and which causes the refractive index of the electro-optic material therein to vary in a linearly relationship with time;
   and in which the means for deflecting the second beam and producing the second phase at the detector surface include:
   a second prism positioned in the path of the second beam said second prism containing electro-optic material, and a source of electric voltage which is applied to the second prism and which causes the refractive index of the electro-optic material therein to vary in a linearly relationship with time.

5. Apparatus in accordance with claim 4 wherein are provided first and second mirrors positioned perpendicular to the paths of the first and second beams, respectively, each mirror being located on the opposite side of each of the prisms, respectively, from the means for providing the first and second beams, thereby reflecting each respective beam back through each respective prism after each said beam has passed through each said respective prism.

6. Apparatus in accordance with claim 4 wherein is further provided a second semisilvered mirror, and wherein are provided first and second mirrors positioned in the paths of the first and second beams, respectively, each mirror being reflected on the opposite side of each of the prisms, respectively, from the means for providing the first and second beams, thereby reflecting and directing each bam upon the second semisilvered mirror after passage of each respective beam through each respective prism.

7. Apparatus in accordance with claim 3 wherein is provided means for detecting the interference pattern formed by the said first and second beams at said detector surface and for integrating the optical intensities in said pattern.

8. Apparatus in accordance with claim 7 wherein is further provided means for indicating the integrated optical intensities in said pattern.

9. In an apparatus for performing a Fourier analysis of a signal by providing an optical interference pattern at a detector surface of first and second intensity modulated coherent beams:
   (a) means for modulating the intensity of at least a part of the cross sections of first and second mutually coherent beams of optical radiation in accordance with the signal; and
   (b) means for deflecting the said beams to form an interference pattern and for producing an angle, between each of the propagation directions of the said beams and a reference line, each angle in an opposite sense from the other, which varies linearly in time.

10. Apparatus in accordance with claim 9 in which the means for deflecting the said beams and for producing the said angle include:
    first and second compound prisms positioned such that the first and second beams are incident upon each respectively, each of said compound prisms including material of variable refractive index; and
    means to vary the refractive index of the said material linearly in time.

11. In an apparatus for performing a Fourier analysis of a signal by providing an optical interference pattern representing the Fourier analysis at a detector surface:
  (a) means for providing first and second beams of mutually coherent optical radiation;
  (b) means for modulating the intensity of at least a part of the cross section of at least one of the beams, in accordance with the signal;
  (c) means for deflecting the first beam to strike the detector surface and producing a first phase thereat, in a first sense which is linearly related to the algebraic product of time with a function of distance along the detector surface; and
  (d) means for deflecting the second beam, to strike the detector surface and to interfere with the first beam thereat, and producing a second phase at said detector surface, said second phase being linearly related to the algebraic product of time with a function of distance along the detector surface in an opposite sense from the first sense.

12. The method of performing a Fourier analysis of a signal which comprises the following steps:
  (a) providing first and second mutually coherent beams of radiation whose intensity is modulated in accordance with the signal to be analyzed over at least a portion of the cross section of at least one of the beams;
  (b) deflecting the first beam to strike a detector surface with a first phase thereat in a first sense which is linearly related to the algebraic product of time with a function of distance along the detector surface;
  (c) deflecting the second beam to strike the detector surface to interfere with the first beam and with a second phase which is linearly related to the algebraic product of time with a function of distance along the detector surface in an opposite sense from the first sense; and
  (d) integrating the resulting intensity of radiation in the resulting interference pattern for a period of time, forming thereby an integrated radiation pattern representative of the Fourier analysis.

References Cited
UNITED STATES PATENTS

| | | | |
|---|---|---|---|
| 2,929,922 | 3/1960 | Schawlow et al. | 332—7.51UX |
| 3,134,840 | 5/1964 | Gamo | 356—113 |
| 3,345,912 | 10/1967 | Lohmann | 356—110 |

EDWARD E. KUBASIEWICZ, Primary Examiner

U.S. Cl. X.R.

356—113